(12) United States Patent
Sehgal et al.

(10) Patent No.: US 10,209,901 B2
(45) Date of Patent: Feb. 19, 2019

(54) SYSTEMS AND METHODS FOR DISTRIBUTIVE DATA STORAGE

(71) Applicant: WAL-MART STORES, INC., Bentonville, AR (US)

(72) Inventors: Charandeep Sehgal, San Jose, CA (US); Vikas Bhat, Newark, CA (US); Ganesh Krishnan, Fremont, CA (US); Venkatesh Kandaswamy, San Ramon, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/398,034

(22) Filed: Jan. 4, 2017

(65) Prior Publication Data
US 2018/0188977 A1    Jul. 5, 2018

(51) Int. Cl.
*G06F 3/06*      (2006.01)

(52) U.S. Cl.
CPC ............ *G06F 3/0613* (2013.01); *G06F 3/065* (2013.01); *G06F 3/067* (2013.01); *G06F 3/0619* (2013.01); *G06F 3/0659* (2013.01)

(58) Field of Classification Search
USPC ........................................................ 711/162
See application file for complete search history.

(56) References Cited

U.S. PATENT DOCUMENTS

| | | | |
|---|---|---|---|
| 7,856,437 B2 | 12/2010 | Kirshenbaum | |
| 8,504,571 B2 | 8/2013 | Howe et al. | |
| 8,549,095 B2 | 10/2013 | Moore et al. | |
| 8,850,019 B2 | 9/2014 | Bembo et al. | |
| 9,158,472 B2 | 10/2015 | Kesselman et al. | |

*Primary Examiner* — Shawn X Gu
*Assistant Examiner* — Jean C Edouard
(74) *Attorney, Agent, or Firm* — Bryan Cave Leighton Paisner LLP

(57) ABSTRACT

In some embodiments, a method can comprise dividing an image into two or more portions and calculating a portion hash value for each portion of the two or more portions, each portion hash value for each portion of the two or more portions is different than an other portion hash value for other portions of the two or more portions. The method can further comprise creating one or more image portion replicas of each portion of the two or more portions by replicating each portion of the two or more portions by a replication factor, the one or more image portion replicas comprising the same portion hash value as each portion of the two or more portions. The method can further comprise sending the one or more image portion replicas to a distributive data storage cluster, the distributive data storage cluster comprising two or more storage nodes, and storing each of the one or more image portion replicas in the two or more storage nodes. Other embodiments of related methods and systems are also provided.

20 Claims, 6 Drawing Sheets

500

505 – Dividing an image into two or more portions.

510 - Calculating a portion hash value for each portion of the two or more portions, each portion hash value for each portion of the two or more portions is different than an other portion hash value for other portions of the two or more portions.

515 - Creating one or more image portion replicas of each portion of the two or more portions by replicating each portion of the two or more portions by a replication factor, the one or more image portion replicas comprising the same portion hash value as each portion of the two or more portions.

520 - Sending the one or more image portion replicas to a distributive data storage cluster, the distributive data storage cluster comprising two or more storage nodes.

525 - Storing each of the one or more image portion replicas in the two or more storage nodes.

530 - Receiving a request to view the image.

535 - Sending a request to retrieve the image from the distributive data storage cluster.

540 - Retrieving the image from the distributive data storage cluster by retrieving a set of the one or more image portion replicas, wherein the set of the one or more image portion replicas comprise the image when combined.

FIG. 5

SYSTEMS AND METHODS FOR DISTRIBUTIVE DATA STORAGE

TECHNICAL FIELD

This disclosure relates generally to systems for distributive data storage, and related methods.

BACKGROUND

System bandwidth can become slow or bottlenecked when storing and retrieving files, such as images of items. Many times, it can be time consuming to retrieve a large image file of an item for display to an online customer. The ability to efficiently store and retrieve files or images can allow for storage scalability, use of high resolution images, and a decrease in required bandwidth during the storage and retrieval processes. Accordingly, there is a need for systems and methods to provide for distributive data storage.

BRIEF DESCRIPTION OF THE DRAWINGS

To facilitate further description of the embodiments, the following drawings are provided in which:

FIG. 5 illustrates is a flowchart for a method, according to an embodiment; and

Figure 1:
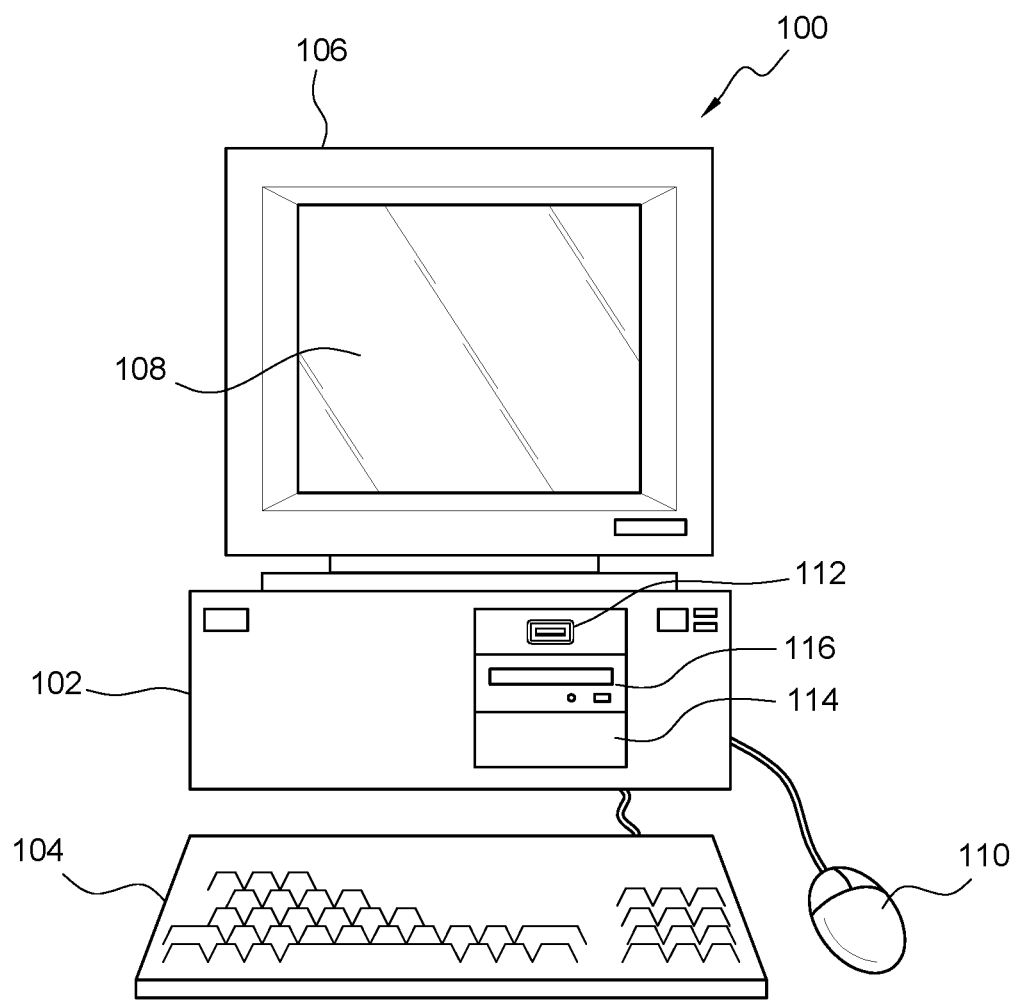
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments can include a system. In many embodiments, the system can comprise one or more processing modules and one or more non-transitory storage modules storing computing instructions configured to run on the one or more processing modules and perform acts. In many embodiments, the acts can comprise dividing an image into two or more portions and calculating a portion hash value for each portion of the two or more portions, each portion hash value for each portion of the two or more portions is different than an other portion hash value for other portions of the two or more portions. In many embodiments, the acts can further comprise creating one or more image portion replicas of each portion of the two or more portions by replicating each portion of the two or more portions by a replication factor, the one or more image portion replicas comprising the same portion hash value as each portion of the two or more portions. In a number of embodiments, the acts can further comprise sending the one or more image portion replicas to a distributive data storage cluster, the distributive data storage cluster comprising two or more storage nodes and storing each of the one or more image portion replicas in the two or more storage nodes. In some embodiments, the acts can comprise receiving a request to view the image, sending a request to retrieve the image from the distributive data storage cluster, and retrieving the image from the distributive data storage cluster by retrieving a set of the one or more image portion replicas, wherein the set of the one or more image portion replicas comprise the image when combined.

In some embodiments, a method can comprise dividing an image into two or more portions and calculating a portion hash value for each portion of the two or more portions, each portion hash value for each portion of the two or more portions is different than an other portion hash value for other portions of the two or more portions. In many embodiments, the method can further comprise creating one or more image portion replicas of each portion of the two or more portions by replicating each portion of the two or more portions by a replication factor, the one or more image portion replicas comprising the same portion hash value as each portion of the two or more portions. In a number of embodiments, the method can further comprise sending the one or more image portion replicas to a distributive data storage cluster, the distributive data storage cluster comprising two or more storage nodes and storing each of the one or more image portion replicas in the two or more storage nodes. In many embodiments, the method can further comprise receiving a request to view the image, sending a request to retrieve the image from the distributive data storage cluster, and retrieving the image from the distributive data storage cluster by retrieving a set of the one or more image portion replicas, wherein the set of the one or more image portion replicas comprise the image when combined.

Various embodiments can include a method. In many embodiments, the method can comprise dividing an image into at least a first portion and a second portion and calculating a first portion hash value for the first portion and a second portion hash value for the second portion, the first portion hash value and the second portion hash value are different from each other. In some embodiments, the method can further comprise creating one or more first image portion replicas of the first portion and one or more second image portion replicas of the second portion, the number of the one or more first image portion replicas and the one or more second image portion replicas is based at least in part on a replication factor, the one or more first image portion replicas comprising the first portion hash value and the one or more second image portion replicas comprising the second portion hash value. In many embodiments, the method can further comprise sending the one or more first image portion replicas and the one or more second image portion replicas to a distributive data storage cluster, the distributive data storage cluster comprising two or more storage nodes and storing each of the one or more first image portion replicas and the one or more second image portion replicas in the two or more storage nodes. In some embodiments, the method can further comprise receiving a request to view the image, sending a request to retrieve the image from the distributive data storage cluster, and retrieving the image from the distributive data storage cluster by retrieving one of the first image portion replicas and one of the second image portion replicas.

Figure 2:
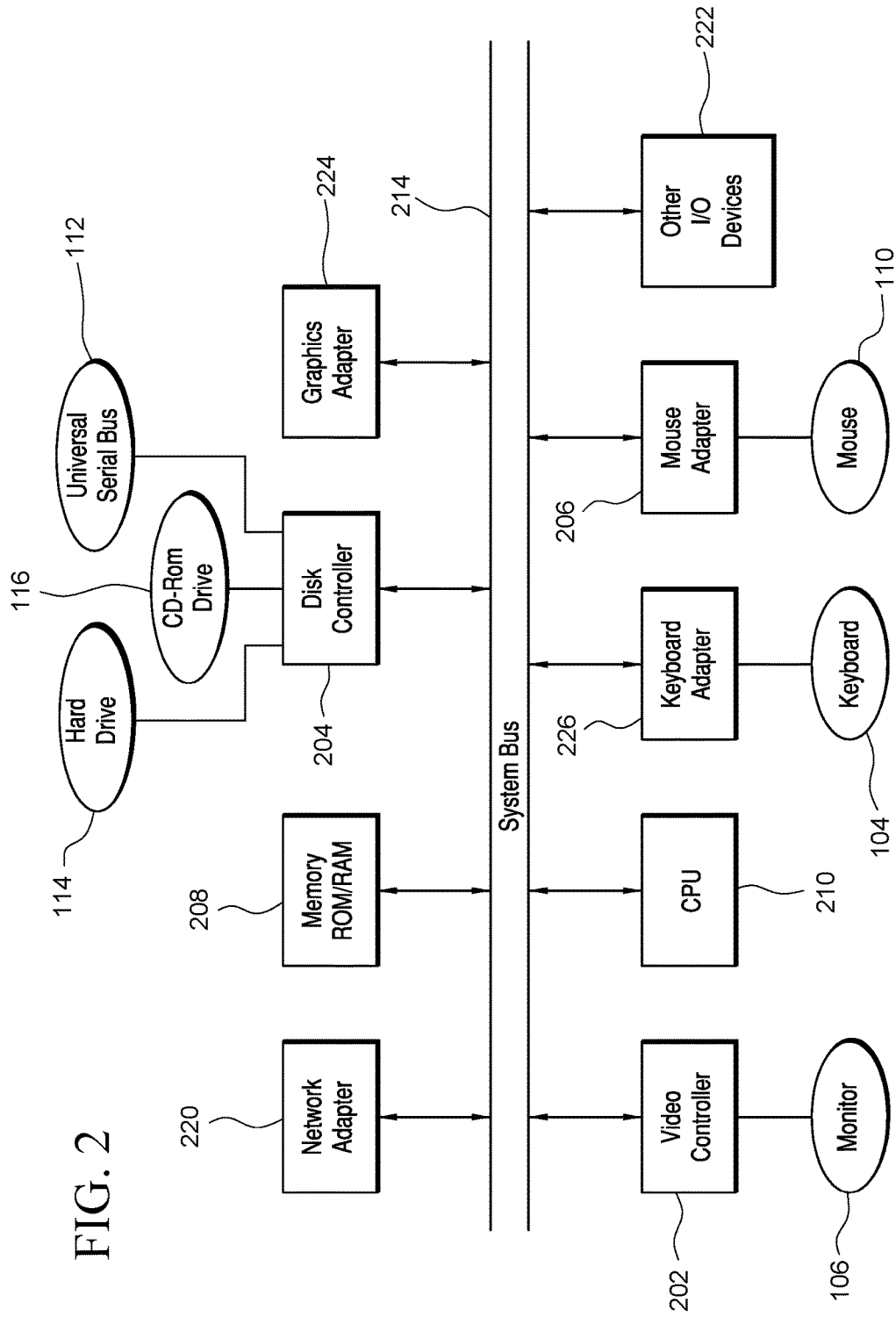
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with a CD-ROM and/or DVD drive 116 (FIGS. 1-2), floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
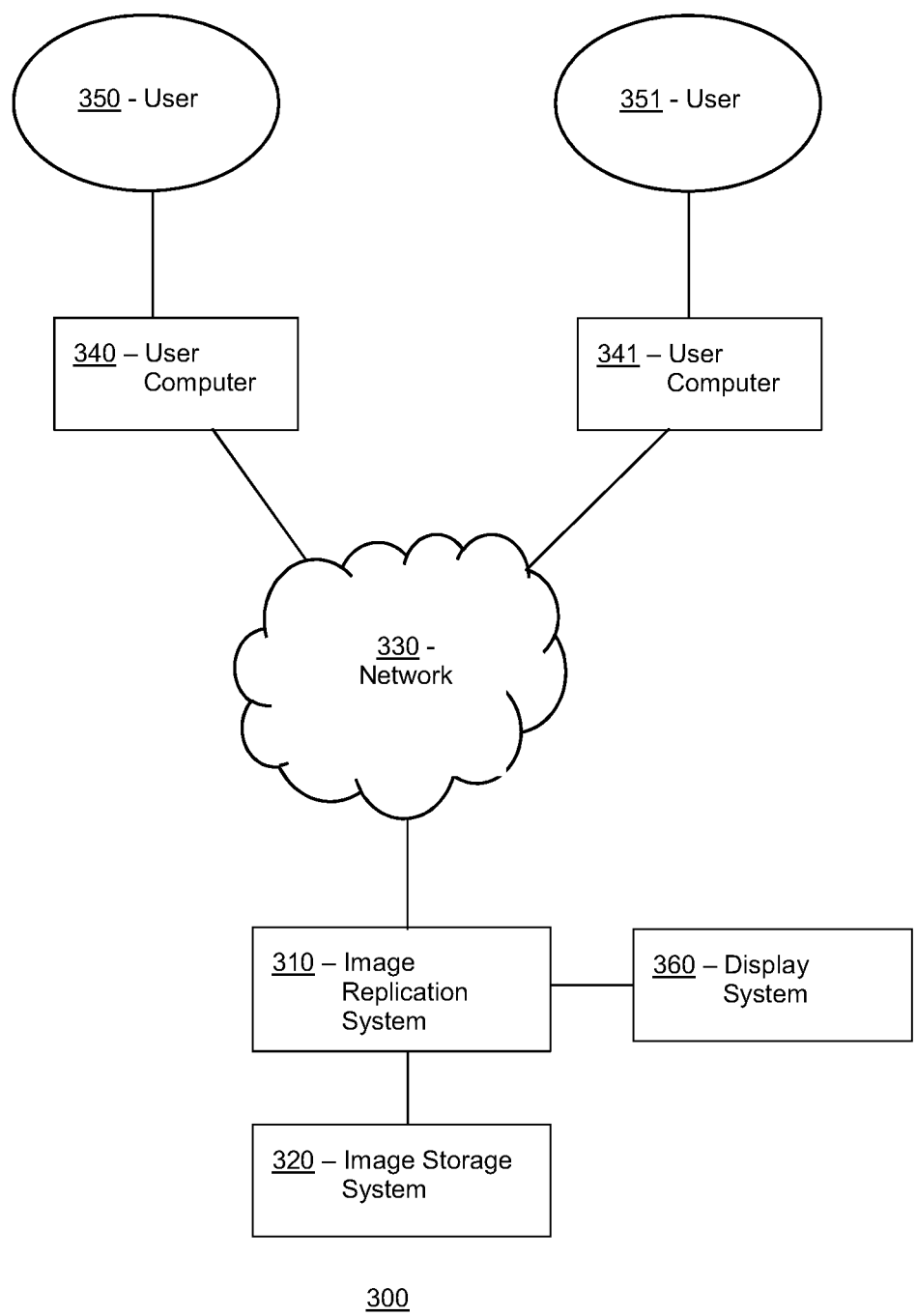
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise an image replication system 310, an image storage system 320, and a display system 360. In some embodiments, image replication system 310, image storage system 320, and display system 360 can each be a computer system 100 (FIG. 1), as described above, and can each be a single computer, a single server, or a cluster or collection of computers or servers. In some embodiments, image storage system 320 can be in communication with an inventory database (not shown) which can track distinct items (e.g., stock keeping units (SKUs)), and images of the distinct items, in a product catalog, which can be ordered through the online retailer and which can be housed at one or more warehouses. In many embodiments, warehouses can comprise brick-and-mortar stores, distribution centers, and/or other storage facilities.

In many embodiments, image replication system 310, image storage system 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of image replication system 310, image storage system 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of image replication system 310, image storage system 320, and/or display system 360. In a similar manner, the processing module(s) and the memory storage module(s) can be local and/or remote to each other.

In many embodiments, image replication system 310 and/or display system 360 can be configured to communicate with one or more customer computers 340 and 341. In some embodiments, customer computers 340 and 341 also can be referred to as user computers. In some embodiments, image replication system 310 and/or display system 360 can communicate or interface (e.g. interact) with one or more customer computers (such as customer computers 340 and 341) through a network 330. In some embodiments, network 330 can be an internet, an intranet that is not open to the public, an email system, and/or a texting system. In many embodiments, network 330 can comprise one or more electronic transmission channels. In many embodiments, the electronic transmission channels can comprise an email, a text message, and/or an electronic notice or message. Accordingly, in many embodiments, image replication system 310 and/or display system 360 (and/or the software used by such systems) can refer to a back end of system 300 operated by an operator and/or administrator of system 300, and customer computers 340 and 341 (and/or the software used by such systems) can refer to a front end of system 300 used by one or more customers 350 and 351, respectively. In some embodiments, customers 350 and 351 also can be referred to as users, in which case, customer computers 340 and 341 can be referred to as user computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, image replication system 310, image storage system 320, and/or display system 360 also can be configured to communicate with one or more databases. The one or more database can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, Postgr-eSQL Database, Microsoft SQL Server Database, Oracle Database, SAP (Systems, Applications, & Products) Database, and IBM DB2 Database.

Meanwhile, communication between image replication system 310, image storage system 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
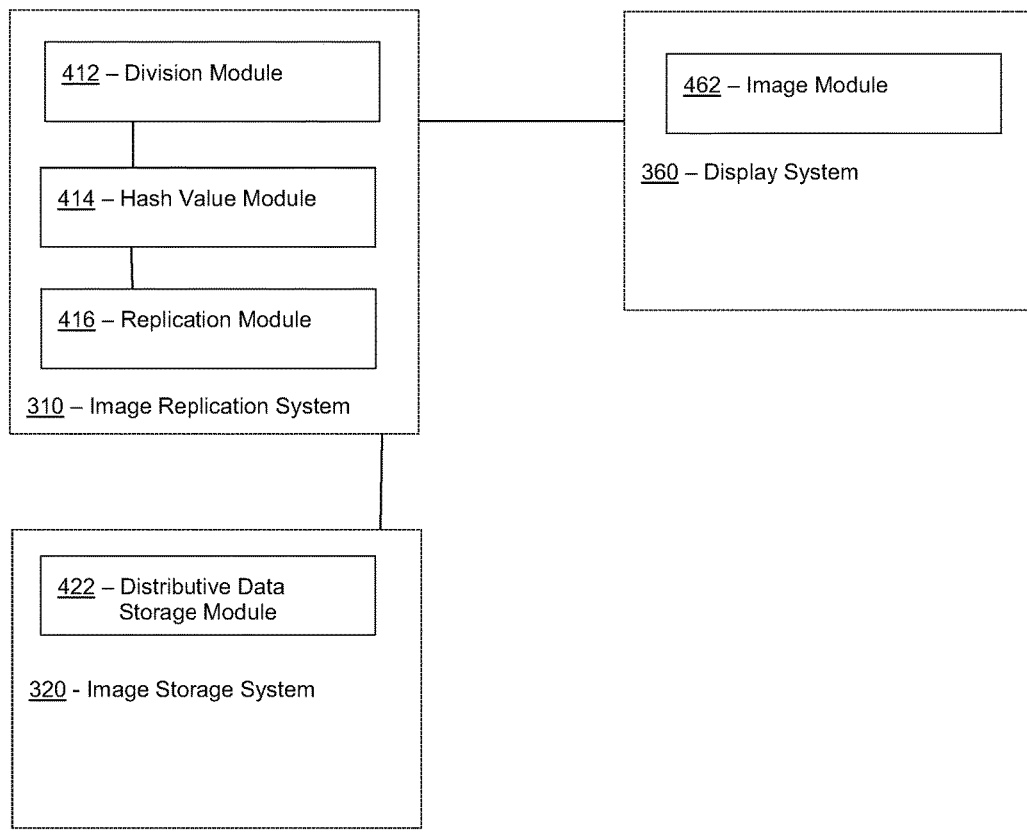
FIG. 4 illustrates a representative block diagram of a portion of the system of FIG. 3, according to an embodiment.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 412, 414, 416, 422, and/or 462 (FIG. 4). Such non-transitory memory storage modules can be part of a computer system such as image replication system 310 (FIGS. 3 & 4), image storage system 320 (FIGS. 3 & 4), and/or display system 360 (FIGS. 3 & 4). The processing module(s) can be similar or identical to the processing module(s) described above with respect to computer system 100 (FIG. 1).

In many embodiments, method 500 can comprise an activity 505 of dividing an image into two or more portions. In some embodiments, the image can be an image file (e.g., a jpeg, gif, or other type of image file). In some embodiments, the image can instead be a data file, a document, a sound file, or a video file. In some embodiments, the image can be an image of a distinct item or SKU in a product catalog, which can be ordered through the online retailer and which can be housed at one or more warehouses. In some embodiments, dividing the image into two or more portions can comprise dividing the image when an image size is greater than a predetermined threshold. In some embodiments, the predetermined threshold can be approximately one megabyte to approximately five megabytes. In some embodiments, the predetermined threshold can be approximately two megabytes. In some embodiments, dividing the image into two or more portions can comprise determining that an image size of the image is greater than two megabytes. In some embodiments, a portion size of each portion of the two or more portions can be less than two megabytes. In some embodiments, a number of the two or more portions can be based at least in part on a replication factor (described below). In some embodiments, the number of the two or more portions can be the same as the replication factor. In some embodiments, the number of the two or more portions can be based at least in part on a number of storage nodes (described below).

In many embodiments, method 500 can further comprise an activity 510 of calculating a portion hash value for each portion of the two or more portions, each portion hash value for each portion of the two or more portions is different than an other portion hash value for other portions of the two or more portions. A hash value or the portion hash value also can be referred to as a label, metadata, or a metadata tag. In many embodiments, the hash value and/or portion hash value can be calculated using a hashing function. In one embodiment, a first portion of the two or more portions can comprise a portion hash value of "0001" and a second portion of the two or portions can comprise a different portion hash value of "0010."

In some embodiments, method 500 can further comprise an activity 515 of creating one or more image portion replicas of each portion of the two or more portions by replicating each portion of the two or more portions by a replication factor, the one or more image portion replicas comprising the same portion hash value as each portion of the two or more portions. Accordingly, when the first portion of the two or more portions comprises a portion hash value of "0001," each replica of the first portion of the two or more portions comprises the same portion hash value of "0001." In numerous embodiments, the replication factor can be based at least in part on a number of the two or more storage nodes in the distributive data storage cluster. In some embodiments, the number of the two or more storage nodes in the distributive data storage cluster can be approximately two to approximately ten. In many embodiments, the number of the two or more storage nodes can be approximately three. In some embodiments, the replication factor can be a predetermined number. In some embodiments, the replication factor can based at least in part on equation 1.

$$\text{Quorum}=(N/2)+1 \qquad \text{(Equation 1)};$$

wherein quorum is a number data centers in a system (e.g., system 300 (FIG. 3)), wherein each data center of the number of data centers comprises a group of networked computer servers, and N is the replication factor. In one embodiment according to equation 1, if there are 2 data centers (quorum=2) then the replication factor is 2, and the one or more image portion replicas of each portion of the two or more portions can be created by replicating each portion of the two or more portions by the replication factor of 2.

In various embodiments, method 500 can further comprise an activity 520 of sending the one or more image portion replicas to a distributive data storage cluster (e.g., image storage system 320 (FIGS. 3 and 4), the distributive data storage cluster can comprise the two or more storage nodes. In some embodiments, the two or more storage nodes can comprise three storage nodes. In some embodiments, each of the two or more storage nodes can be in a different data center of the number of data centers from each other. In some embodiments the two or more storage nodes can be in a same data center of the number of data centers.

In a number of embodiments, method 500 can further comprise an activity 525 of storing each of the one or more image portion replicas in the two or more storage nodes. In many embodiments, activity 525 of storing each of the one or more image portion replicas in the two or more storage nodes can comprise storing each replica of a first image portion of the one or more image portion replicas on each of the two or more storage nodes. In some embodiments, activity 525 of storing each of the one or more image portion replicas in the two or more storage nodes can comprise storing each replica of a first image portion of the one or more image portion replicas on a majority of the two or more storage nodes. In some embodiments, one or both of activities 520 and 525 can include sending and/or storing the one or more image portion replicas over different databases and/or at different data centers. One advantage of sending and storing the one or more image portion replicas over different data bases and/or at different data centers is that storage scalability can be increased, high resolution images can be used without increases system network bottlenecking, and required bandwidth during the storage and retrieval processes can be decreased.

In many embodiments, method 500 can further comprise an activity 530 of receiving a request to view the image. In some embodiments, the request to view the image can come from one or more customers or users (e.g. user 350 or 351 (FIG. 3)) over a network (e.g., network 330 (FIG. 3)).

In some embodiments, method 500 can further comprise an activity 535 of sending a request to retrieve the image from the distributive data storage cluster (e.g., image storage system 320 (FIGS. 3 and 4)).

In a number of embodiments, method 500 can further comprise an activity 540 of retrieving the image from the distributive data storage cluster by retrieving a set of the one or more image portion replicas, wherein the set of the one or more image portion replicas comprise the image when combined. In some embodiments, one or both of activities 535 and 540 can include sending the request to retrieve and/or retrieving the image from different databases and/or different data centers. One advantage of sending the request to retrieve and retrieving the one or more image portion replicas over different data bases and/or at different data centers is that storage scalability can be increased, high resolution images can be used without increases system network bottlenecking, and required bandwidth during the storage and retrieval processes can be decreased.

In some embodiments, after activity 540, method 500 can further comprise an activity of calculating a retrieved portion hash value for each portion of the two or more portions associated with the set of the one or more image portion replicas retrieved. Afterwards, in a number of embodiments, method 500 can further comprise an activity of determining that the retrieved portion hash value for each portion of the two or more portions associated with the set of the one or more image portion replicas retrieved matches the portion hash value for each portion of the two or more portions. An advantage of the activities of (a) calculating a retrieved portion hash value for each portion of the two or more portions associated with the set of the one or more image portion replicas retrieved and (b) determining that the retrieved portion hash value for each portion of the two or more portions associated with the set of the one or more image portion replicas retrieved matches the portion hash value for each portion of the two or more portions can comprise: confirming that the correct one or more image portion replicas have been retrieved and have not been corrupted. In various embodiments, method 500 can further comprise an activity of merging the set of the one or more image portion replicas into the image.

One or more advantages of activity 505 can comprise efficient storage of smaller portions of an image. Activity 505 of dividing an image into two or more portions can decrease downtime and/or latency when storing and recalling the two or more portions of the image. In some embodiments, a portion of the two or more portions of the image can be stored at a same time and/or retrieved at a same time. An advantage of activity 515 of creating one or more image portion replicas of each portion of the two or more portions by replicating each portion of the two or more portions by a replication factor, the one or more image portion replicas comprising the same portion hash value as each portion of the two or more portions, can comprise decreasing a likelihood of file corruption and/or other storage and retrieval issues. Further, an advantage of activity 510 of calculating a portion hash value for each portion of the two or more portions, each portion hash value for each portion of the two or more portions is different than an other portion hash value for other portions of the two or more portions, can comprise using the portion hash value for each portion of the two or more portions to ensure a correct portion of the two or more portions has been retrieved.

Figure 6:
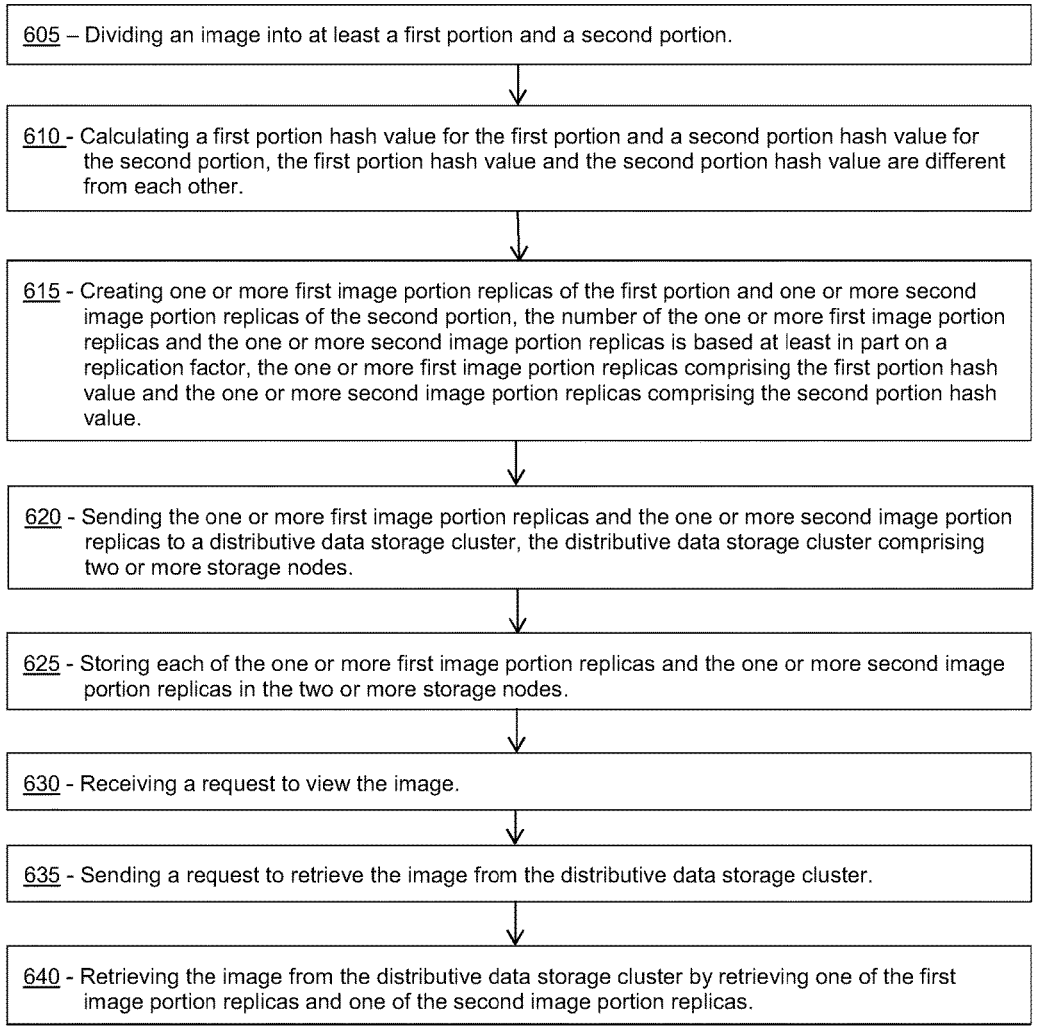
FIG. 6 illustrates a flowchart for another method, according to another embodiment.

FIG. 6 illustrates a flow chart for a method 600, according to an embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 300 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules 412, 414, 416, 422, and/or 462 (FIG. 4). Such non-transitory memory storage modules can be part of a computer system such as image replication system 310 (FIGS. 3 & 4), image storage system 320 (FIGS. 3 & 4), and/or display system 360 (FIGS. 3 & 4). The processing module(s) can be similar or identical to the processing module(s) described above with respect to computer system 100 (FIG. 1). In many embodiments, method 600 can be similar to method 500 (FIG. 5).

In many embodiments, method 600 can comprise an activity 605 of dividing an image into at least a first portion and a second portion. In some embodiments, activity 605 of dividing an image into at least a first portion and a second portion can be similar to activity 505 (FIG. 5) of dividing an image into two or more portions.

In many embodiments, method 600 can further comprise an activity 610 of calculating a first portion hash value for the first portion and a second portion hash value for the second portion, the first portion hash value and the second portion hash value are different from each other. In some embodiments, activity 610 of calculating a first portion hash value for the first portion and a second portion hash value for the second portion, the first portion hash value and the second portion hash value are different from each other, can be similar to activity 510 (FIG. 5) of calculating a portion hash value for each portion of the two or more portions, each portion hash value for each portion of the two or more portions is different than an other portion hash value for other portions of the two or more portions.

In some embodiments, method 600 can further comprise an activity 615 of creating one or more first image portion replicas of the first portion and one or more second image portion replicas of the second portion, the number of the one or more first image portion replicas and the one or more second image portion replicas is based at least in part on a replication factor, the one or more first image portion replicas comprising the first portion hash value and the one or more second image portion replicas comprising the second portion hash value. In a number of embodiments, activity 615 of creating one or more first image portion replicas of the first portion and one or more second image portion replicas of the second portion, the number of the one or more first image portion replicas and the one or more second image portion replicas is based at least in part on a replication factor, the one or more first image portion replicas comprising the first portion hash value and the one or more second image portion replicas comprising the second portion hash value can be similar to activity 515 (FIG. 5) of creating one or more image portion replicas of each portion of the two or more portions by replicating each portion of the two or more portions by a replication factor, the one or more image portion replicas comprising the same portion hash value as each portion of the two or more portions.

In various embodiments, method 600 can further comprise an activity 620 of sending the one or more first image portion replicas and the one or more second image portion replicas to a distributive data storage cluster, the distributive data storage cluster comprising two or more storage nodes. In many embodiments, activity 620 of sending the one or more first image portion replicas and the one or more second image portion replicas to a distributive data storage cluster, the distributive data storage cluster comprising two or more storage nodes can be similar to activity 520 (FIG. 5) of sending the one or more image portion replicas to a distributive data storage cluster, the distributive data storage cluster comprising two or more storage nodes.

In some embodiments, method 600 can further comprise an activity 625 of storing each of the one or more first image portion replicas and the one or more second image portion replicas in the two or more storage nodes. In many embodiments, activity 625 of storing each of the one or more first image portion replicas and the one or more second image portion replicas in the two or more storage nodes can be similar to activity 525 (FIG. 5) of storing each of the one or more image portion replicas in the two or more storage nodes.

In a number of embodiments, method 600 can further comprise an activity 630 of receiving a request to view the image. In many embodiments, activity 630 of receiving a request to view the image can be similar to activity 530 (FIG. 5) of receiving a request to view the image.

In various embodiments, method 600 can further comprise an activity 635 of sending a request to retrieve the image from the distributive data storage cluster. In many embodiments, activity 635 of sending a request to retrieve the image from the distributive data storage cluster can be similar to activity 530 (FIG. 5) of sending a request to retrieve the image from the distributive data storage cluster.

In various embodiments, method 600 can further comprise an activity 640 of retrieving the image from the distributive data storage cluster by retrieving one of the first image portion replicas and one of the second image portion replicas. In many embodiments, activity 640 of retrieving the image from the distributive data storage cluster by retrieving one of the first image portion replicas and one of the second image portion replicas can be similar to activity 540 (FIG. 5) of retrieving the image from the distributive data storage cluster by retrieving a set of the one or more image portion replicas, wherein the set of the one or more image portion replicas comprise the image when combined.

In some embodiments, method 600 can further comprise an activity of calculating a retrieved first portion hash value for the one of the first image portion replicas retrieved and also calculating a retrieved second portion hash value for the one of the second image portion replicas retrieved, and then determining that the retrieved first portion hash value matches the first portion hash value and that the retrieved second portion hash value matches the second portion hash value. An advantage to the activities of (a) calculating a retrieved first portion hash value for the one of the first image portion replicas retrieved and (b) calculating a retrieved second portion hash value for the one of the second image portion replicas retrieved, and then determining that the retrieved first portion hash value matches the first portion hash value and that the retrieved second portion hash value matches the second portion hash value can comprise confirming that the correct one first image portion replicas and second image portion replicas have been retrieved and have not been corrupted. In a number of embodiments, method 600 can further comprise an activity of merging the one of the first image portion replicas and the one of the second image portion replicas into the image. The other variations described above for method 500 (FIG. 5) also can apply here to method 600.

Returning to FIG. 4, FIG. 4 illustrates a block diagram of a portion of system 300 comprising image replication system 310, image storage system 320, and/or display system 360, according to the embodiment shown in FIG. 3. each of image replication system 310, image storage system 320, and/or display system 360 are merely exemplary and are not limited to the embodiments presented herein. Each of image replication system 310, image storage system 320, and/or display system 360 can be employed in many different embodiments or examples not specifically depicted or described herein. In some embodiments, certain elements or modules of image replication system 310, image storage system 320, and/or display system 360 can perform various procedures, processes, and/or acts. In other embodiments, the procedures, processes, and/or acts can be performed by other suitable elements or modules.

In many embodiments, image replication system 310 can comprise non-transitory memory storage modules 412, 414, and 416, image storage system 320 can comprise non-transitory memory storage module 422, and display system 360 can comprise a non-transitory memory storage module 462. Memory storage module 412 can be referred to as a division module 412, memory storage module 414 can be referred to as a hash value module 414, and memory storage module 416 can be referred to as replication module 416. Memory storage module 422 can be referred to as a distributive data storage module 422. Memory storage module 462 can be referred to as an image module 462.

In many embodiments, division module 412 can store computing instructions configured to run on one or more processing modules and perform one or more acts of methods 500 (FIG. 5) (e.g., activity 505 of dividing an image into two or more portions (FIG. 5)) and/or one or more acts of method 600 (FIG. 6) (e.g., activity 605 of dividing an image into at least a first portion and a second portion (FIG. 6)).

In some embodiments, hash value module 414 can store computing instructions configured to run on one or more processing modules and perform one or more acts of method 500 (FIG. 5) (e.g., activity 510 of calculating a portion hash value for each portion of the two or more portions, each portion hash value for each portion of the two or more portions is different than an other portion hash value for other portions of the two or more portions (FIG. 5) and/or one or more acts of method 600 (FIG. 6) (e.g., activity 610 of calculating a first portion hash value for the first portion and a second portion hash value for the second portion, the first portion hash value and the second portion hash value are different from each other (FIG. 6)).

In many embodiments, replication module 416 can store computing instructions configured to run on one or more processing modules and perform one or more acts of methods 500 (FIG. 5) (e.g., activity 515 of creating one or more image portion replicas of each portion of the two or more portions by replicating each portion of the two or more portions by a replication factor, the one or more image portion replicas comprising the same portion hash value as each portion of the two or more portions (FIG. 5) and/or activity 520 of sending the one or more image portion replicas to a distributive data storage cluster, the distributive data storage cluster comprising two or more storage nodes (FIG. 5) and/or one or more acts of method 600 (FIG. 6) (e.g., activity 615 of creating one or more first image portion replicas of the first portion and one or more second image portion replicas of the second portion, the number of the one or more first image portion replicas and the one or more second image portion replicas is based at least in part on a replication factor, the one or more first image portion replicas comprising the first portion hash value and the one or more second image portion replicas comprising the second portion hash value (FIG. 6) and/or activity 620 of sending the one or more first image portion replicas and the one or more second image portion replicas to a distributive data storage cluster, the distributive data storage cluster comprising two or more storage nodes (FIG. 6)).

In many embodiments, distributive data storage module 422 can store computing instructions configured to run on one or more processing modules and perform one or more acts of method 500 (FIG. 5) (e.g., activity 525 of storing each of the one or more image portion replicas in the two or more storage nodes (FIG. 5)) and/or one or more acts of method 600 (e.g., activity 625 of storing each of the one or more first image portion replicas and the one or more second image portion replicas in the two or more storage nodes (FIG. 6)).

In some embodiments, image module 462 can store computing instructions configured to run on one or more processing modules and perform one or more acts of method 500 (FIG. 5) (e.g., activity 530 of receiving a request to view the image (FIG. 5), activity 535 of sending a request to retrieve the image from the distributive data storage cluster (FIG. 5), and/or activity 540 of retrieving the image from the distributive data storage cluster by retrieving a set of the one or more image portion replicas, wherein the set of the one or more image portion replicas comprise the image when combined (FIG. 5)) and/or one or more acts of method 600 (FIG. 6) (e.g., activity 630 of receiving a request to view the image (FIG. 6), activity 635 of sending a request to retrieve the image from the distributive data storage cluster (FIG. 6), and/or activity 640 of retrieving the image from the distributive data storage cluster by retrieving one of the first image portion replicas and one of the second image portion replicas (FIG. 6)).

Although systems and methods for search result comparison been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the activities of FIGS. 5-6 may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for more efficient upload, storage, and retrieval of images, the system comprising:
   one or more processing modules; and
   one or more non-transitory storage modules storing computing instructions configured to run on the one or more processing modules and perform acts of:
      dividing an image into two or more portions;
      calculating a portion hash value for each portion of the two or more portions, wherein each portion hash value for each portion of the two or more portions is different than other portion hash values for other portions of the two or more portions;
      creating one or more image portion replicas of each portion of the two or more portions by replicating each portion of the two or more portions by a replication factor, the one or more image portion replicas comprising a same portion hash value as each corresponding portion of the two or more portions;
      sending the one or more image portion replicas to a distributive data storage cluster, the distributive data storage cluster comprising two or more storage nodes;
      storing each of the one or more image portion replicas in the two or more storage nodes, thereby resulting in the more efficient upload, storage, and retrieval of the image;
      receiving, from an electronic device of a user, a request to view the image;
      sending a request to retrieve the image from the distributive data storage cluster;
      retrieving the image from the distributive data storage cluster by retrieving a set of the one or more image portion replicas, wherein the set of the one or more image portion replicas, when combined, comprises the image, thereby resulting in the more efficient retrieval of the image; and
      transmitting instructions to display, on the electronic device of the user, the image.

2. The system of claim 1, wherein:
   dividing the image into the two or more portions comprises determining that an image size of the image is greater than 2 megabytes.

3. The system of claim 2, wherein:
   a portion size of each portion of the two or more portions is less than 2 megabytes.

4. The system of claim 1, wherein the one or more non-transitory storage modules storing the computing instructions are configured to run on the one or more processing modules and further perform acts of:
   calculating a retrieved portion hash value for each portion of the two or more portions associated with the set of the one or more image portion replicas retrieved; and
   determining that the retrieved portion hash value for each portion of the two or more portions associated with the set of the one or more image portion replicas retrieved matches the portion hash value for each portion of the two or more portions, thereby confirming that the one or more image portion replicas retrieved have not been corrupted.

5. The system of claim 1, wherein the one or more non-transitory storage modules storing the computing instructions are configured to run on the one or more processing modules and further perform an act of:
   merging the set of the one or more image portion replicas into the image.

6. The system of claim 1, wherein:
   each of the one or more image portion replicas of the set of the one or more image portion replicas comprise a fastest responding image portion replica.

7. The system of claim 1, wherein:
   the distributive data storage cluster comprises three storage nodes.

8. The system of claim 1, wherein:
   the replication factor is based at least in part on a number of the two or more storage nodes in the distributive data storage cluster.

9. A method for more efficient upload, storage, and retrieval of images, the method comprising:

dividing an image into two or more portions;
calculating a portion hash value for each portion of the two or more portions, wherein each portion hash value for each portion of the two or more portions is different than other portion hash values for other portions of the two or more portions;
creating one or more image portion replicas of each portion of the two or more portions by replicating each portion of the two or more portions by a replication factor, the one or more image portion replicas comprising a same portion hash value as each corresponding portion of the two or more portions;
sending the one or more image portion replicas to a distributive data storage cluster, the distributive data storage cluster comprising two or more storage nodes;
storing each of the one or more image portion replicas in the two or more storage nodes, thereby resulting in the more efficient upload, storage, and retrieval of the image;
receiving, from an electronic device of a user, a request to view the image;
sending a request to retrieve the image from the distributive data storage cluster;
retrieving the image from the distributive data storage cluster by retrieving a set of the one or more image portion replicas, wherein the set of the one or more image portion replicas, when combined, comprises the image, thereby resulting in the more efficient retrieval of the image; and
transmitting instructions to display, on the electronic device of the user, the image.

10. The method of claim 9, wherein:
dividing the image into the two or more portions comprises determining that an image size of the image is greater than 2 megabytes.

11. The method of claim 9, further comprising:
calculating a retrieved portion hash value for each portion of the two or more portions associated with the set of the one or more image portion replicas retrieved; and
determining that the retrieved portion hash value for each portion of the two or more portions associated with the set of the one or more image portion replicas retrieved matches the portion hash value for each portion of the two or more portions, thereby confirming that the one or more image portion replicas retrieved have not been corrupted.

12. The method of claim 9, further comprising:
merging the set of the one or more image portion replicas into the image.

13. The method of claim 9, wherein:
each of the one or more image portion replicas of the set of the one or more image portion replicas comprise a fastest responding image portion replica.

14. The method of claim 9, wherein:
the distributive data storage cluster comprises three storage nodes.

15. The method of claim 9, wherein:
the replication factor is based at least in part on a number of the two or more storage nodes in the distributive data storage cluster.

16. A method for more efficient upload, storage, and retrieval of images, the method comprising:
dividing an image into at least a first portion and a second portion;
calculating a first portion hash value for the first portion and a second portion hash value for the second portion, wherein the first portion hash value and the second portion hash value are different from each other;
creating one or more first image portion replicas of the first portion and one or more second image portion replicas of the second portion, wherein:
a number of the one or more first image portion replicas and the one or more second image portion replicas are based at least in part on a replication factor;
the one or more first image portion replicas comprise the first portion hash value; and
the one or more second image portion replicas comprise the second portion hash value;
sending the one or more first image portion replicas and the one or more second image portion replicas to a distributive data storage cluster, the distributive data storage cluster comprising two or more storage nodes;
storing each of the one or more first image portion replicas and the one or more second image portion replicas in the two or more storage nodes, thereby resulting in the more efficient retrieval of the image;
receiving, from an electronic device of a user, a request to view the image;
sending a request to retrieve the image from the distributive data storage cluster;
retrieving the image from the distributive data storage cluster by retrieving one of the one or more first image portion replicas and one of the one or more second image portion replicas, thereby resulting in the more efficient retrieval of the image; and
transmitting instructions to display, on the electronic device of the user, the image.

17. The method of claim 16, wherein:
dividing the image into at least the first portion and the second portion comprises determining that an image size of the image is greater than 2 megabytes.

18. The method of claim 16, further comprising:
calculating a retrieved first portion hash value for the one of the one or more first image portion replicas retrieved, and a retrieved second portion hash value for the one of the one or more second image portion replicas retrieved; and
determining that the retrieved first portion hash value matches the first portion hash value and that the retrieved second portion hash value matches the second portion hash value, thereby confirming that one or more image portion replicas retrieved have not been corrupted.

19. The method of claim 16, further comprising:
merging the one of the one or more first image portion replicas and the one of the one or more second image portion replicas into the image.

20. The method of claim 16, wherein:
the one of the one or more first image portion replicas comprises a fastest responding first image portion replica of the one or more first image portion replicas and the one of the one or more second image portion replicas comprises a fastest responding second image portion replica of the one or more second image portion replicas.

* * * * *